J. D. Pell,

Animal Trap.

No. 112,844.   Patented Mar. 21, 1871.

Witnesses:
A. V. Almqvist
Alex. F. Roberts

Inventor:
J. D. Pell
per Munn & Co
Attorneys.

United States Patent Office.

JAMES D. PELL, OF NEW YORK, N. Y.

Letters Patent No. 112,844, dated March 21, 1871.

IMPROVEMENT IN ANIMAL-TRAPS.

The Schedule referred to in these Letters Patent and making part of the same.

*To all whom it may concern:*

Be it known that I, JAMES D. PELL, of the city, county, and State of New York, have invented a new and useful Improvement in Animal-Trap; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
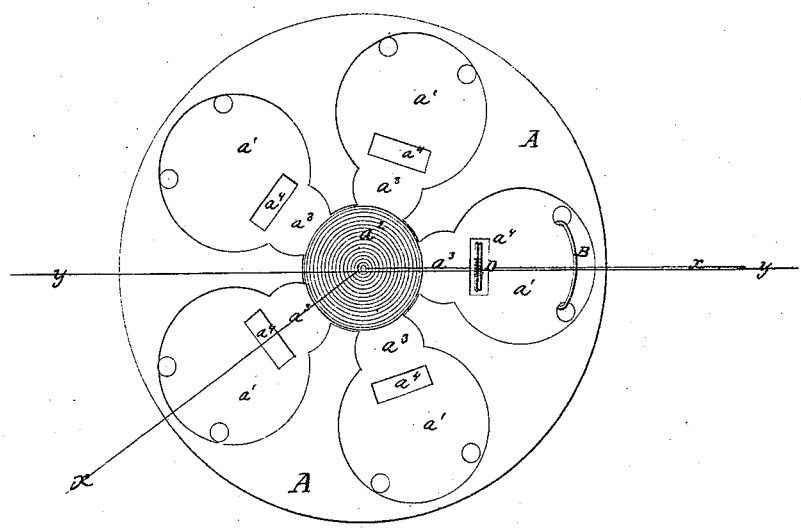
Figure 1 is a bottom view of a trap to which my improvements have been attached.
Figure 2:
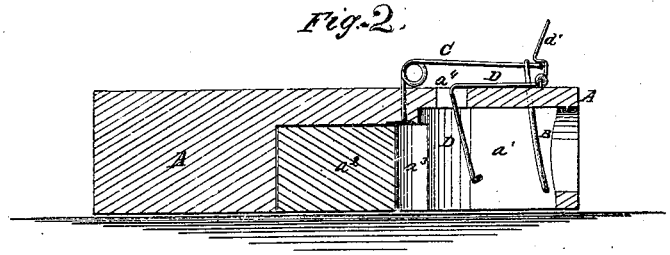
Figure 2 is a detail sectional view of the same taken through the line $y\ y$, fig. 1.

My invention has for its object to improve the construction of the ordinary wooden animal-traps so as to make them more convenient in use and more effective in operation; and It consists in the construction and combination of various parts of the trap, as hereinafter more fully described.

A represents the wooden part of the trap, which is represented in the drawing as being round, and with five holes, $a^1$; but the shape and the number of holes are entirely immaterial.

In the center of the under side of the trap is formed a hole or recess, $a^2$, to receive the bait, and which communicates with the ordinary holes $a^1$ of the trap by channels $a^3$.

B is the wire loop by which the animal is caught, the ends of the arms of which are connected with the spring-loop C in the ordinary manner.

D is the trigger, which is made in the form of a wire loop, and passes down through a hole, $a^4$, in the wooden part A, so as to hang in the rear part of the holes $a^1$, just opposite the mouth of the channels $a^3$, so that the animal cannot reach the bait in the hole $a^2$ without touching the said trigger D and springing the trap.

At the top of the wooden part A the trigger-loop D is bent nearly at right angles, and extends along the top of the said part A to a point about in line with the points at which the arms of the loop B pass through the part A into the holes $a^1$, where it is pivoted to the said wooden part A by a wire staple.

The wire of the loop D, at or just above its pivoting point, is bent to form a shoulder or catch, $d'$, which is so formed and arranged as to catch automatically upon the spring-loop C when said loop is pressed downward, thus setting the trap.

With this construction one bait serves for all the holes of the trap, however many of said holes there may be, and the said bait is so placed that the animals, in attempting to reach it, will unavoidably touch the trigger-loop D and spring the trap, so that the bait cannot be eaten by the animals, and will not require to be renewed except at long intervals.

This construction also enables the trap to be set without touching the parts of the trap with which the animals have been in contact.

Having thus fully described my invention,

I claim as new, and desire to secure by Letters Patent—

1. The automatic self-catching trigger D D $d'$ pivoted on the top of the trap, and bent into the shape described, when combined with loop B and spring C, for the purpose specified.

2. The central chamber $a^2$, to receive a single bait, combined, as described, with a series of open chambers, $a^1$, surrounding it, and each provided with a loop, B, and trigger D, operating, as specified, to catch the invader before he reaches the bait.

The above specification of my invention signed by me this 12th day of November, 1870.

JAMES D. PELL.

Witnesses:
JAMES T. GRAHAM,
T. B. MOSHER.